United States Patent
Cronin et al.

(10) Patent No.: US 9,659,102 B1
(45) Date of Patent: May 23, 2017

(54) EVENT APPLICATION

(71) Applicant: ProSports Technologies, LLC, Miami, FL (US)

(72) Inventors: John E. Cronin, Bonita Springs, FL (US); Joseph George Bodkin, South Burlington, VT (US); Christopher Michael Huffines, Williston, VT (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 15/076,043

(22) Filed: Mar. 21, 2016

Related U.S. Application Data (63) Continuation of application No. 14/788,751, filed on Jun. 30, 2015, now Pat. No. 9,319,838.

(60) Provisional application No. 62/023,520, filed on Jul. 11, 2014, provisional application No. 62/045,030, filed on Sep. 3, 2014, provisional application No. 62/045,032, filed on Sep. 3, 2014, provisional application No. 62/045,034, filed on Sep. 3, 2014.

(51) Int. Cl.
| | |
|---|---|
| *H04W 4/00* | (2009.01) |
| *G06F 17/30* | (2006.01) |
| *H04L 29/08* | (2006.01) |

(52) U.S. Cl.
CPC .. *G06F 17/30879* (2013.01); *G06F 17/30554* (2013.01); *G06F 17/30867* (2013.01); *H04L 67/10* (2013.01)

(58) Field of Classification Search
CPC ......... G06F 17/30879; G06F 17/30554; G06F 17/30867; H04L 67/10
See application file for complete search history.

(56) References Cited

U.S. PATENT DOCUMENTS

| | | |
|---|---|---|
| 3,997,044 A | 12/1976 | Schasser |
| 5,797,126 A | 8/1998 | Helbling et al. |
| 7,044,362 B2 | 5/2006 | Yu |
| 7,080,882 B2 | 7/2006 | Stitt |
| 8,313,018 B2 | 11/2012 | Wang et al. |
| 8,639,541 B2 | 1/2014 | Sunshine et al. |

(Continued)

FOREIGN PATENT DOCUMENTS

| | | |
|---|---|---|
| CA | 2 625 887 | 9/2008 |
| EP | 2 213 503 | 1/2013 |

(Continued)

OTHER PUBLICATIONS

Alemzadeh, Mehrnoush; "Movie Ticket Dispenser Website (web-app) MTD", SENG 697: Agent-Based Software Engineering, Oct. 2006.

(Continued)

*Primary Examiner* — Ajit Patel
(74) *Attorney, Agent, or Firm* — Polsinelli LLP (57) ABSTRACT

The present invention includes systems and methods for providing event information. A one-time use app is downloaded to a user device when a user elects to purchase the app. The app receives event-related information from an event database. The event database receives information from a plurality of sources. The sources are each associated with an application programming interface. The app provides event-related information to the user through purchased options. The app can filter information based on a user profile before providing the information to the user.

20 Claims, 10 Drawing Sheets

(56) References Cited

U.S. PATENT DOCUMENTS

| | | | |
|---|---|---|---|
| 8,676,615 | B2 | 3/2014 | Callaghan et al. |
| 9,319,838 | B1 | 4/2016 | Cronin et al. |
| 2002/0087395 | A1 | 7/2002 | Goodman |
| 2003/0014330 | A1 | 1/2003 | Showghi et al. |
| 2003/0069904 | A1 | 4/2003 | Hsu et al. |
| 2003/0076417 | A1 | 4/2003 | Thomas et al. |
| 2004/0004376 | A1 | 1/2004 | Cabebe |
| 2006/0250278 | A1 | 11/2006 | Tillotson |
| 2007/0054695 | A1 | 3/2007 | Huske et al. |
| 2008/0146302 | A1 | 6/2008 | Olsen et al. |
| 2010/0082374 | A1* | 4/2010 | Charania ............... G06Q 10/02 705/5 |
| 2010/0219234 | A1 | 9/2010 | Forbes |
| 2011/0147448 | A1 | 6/2011 | Manuel-Devadoss |
| 2011/0173032 | A1 | 7/2011 | Payne et al. |
| 2011/0246369 | A1 | 10/2011 | de Oliveira et al. |
| 2012/0149396 | A1* | 6/2012 | Fan ...................... H04W 4/021 455/456.3 |
| 2013/0096981 | A1 | 4/2013 | Evans et al. |
| 2013/0151295 | A1 | 6/2013 | Denker et al. |
| 2013/0159030 | A1 | 6/2013 | Tattenbaum et al. |
| 2013/0251216 | A1 | 9/2013 | Smowton et al. |
| 2013/0290413 | A1 | 10/2013 | Jones |
| 2013/0300073 | A1 | 11/2013 | Venton-Walters et al. |
| 2013/0325525 | A1 | 12/2013 | Boyd |
| 2013/0325621 | A1 | 12/2013 | Sanginiti et al. |
| 2014/0100896 | A1 | 4/2014 | Du et al. |
| 2014/0100898 | A1* | 4/2014 | Bruckhaus ............. G06Q 30/00 705/5 |
| 2014/0176348 | A1 | 6/2014 | Acker et al. |
| 2014/0188614 | A1 | 7/2014 | Badenhop |
| 2014/0195277 | A1 | 7/2014 | Kim |
| 2014/0292481 | A1 | 10/2014 | Dumas et al. |
| 2014/0330881 | A1* | 11/2014 | Stone .................... H04L 67/10 709/201 |
| 2014/0379819 | A1 | 12/2014 | Chestnut et al. |
| 2015/0057025 | A1 | 2/2015 | Malik |
| 2015/0066545 | A1 | 3/2015 | Kotecha et al. |
| 2015/0120342 | A1 | 4/2015 | Dragon et al. |
| 2015/0227969 | A1 | 8/2015 | Hanly |
| 2015/0242888 | A1 | 8/2015 | Zises |
| 2015/0262086 | A1 | 9/2015 | Mader et al. |
| 2015/0319223 | A1* | 11/2015 | Deepak Narayana .. H04L 67/10 709/206 |
| 2015/0382144 | A1 | 12/2015 | Lopez |
| 2016/0012515 | A1 | 1/2016 | Cronin |
| 2016/0055690 | A1 | 2/2016 | Raina et al. |
| 2016/0071030 | A1 | 3/2016 | Cronin |

FOREIGN PATENT DOCUMENTS

| | | |
|---|---|---|
| WO | WO 02/065358 | 8/2002 |
| WO | WO 2008/124168 | 10/2008 |
| WO | WO 2013/070271 | 5/2013 |
| WO | WO 2016/007961 | 1/2016 |
| WO | WO 2016/040031 | 3/2016 |

OTHER PUBLICATIONS

"Apple Introduces us to a New iTunes "Concert Ticket +" System", Patently Apple, Apr. 15, 2010.
Bayless et al., Steven H.; "Smart Parking and the Connected Consumer—Opportunities for Facility Operators and Municipalities", The Intelligent Transportation Society of America (ITS America) Dec. 2012.
Borison, Rebecca; "Golden State Warriors enhance game day with beacon technology", Mobile Commerce Daily—Software Technology, Mar. 25, 2014.
Borison, Rebecca; Sports and entertainment venues flock to beaons for commerce opportunities. Mobile Commerce Daily. (Feb. 6, 2014.).
"Chair Features", The Back Massagers. Date of Download: May 1, 2014 http://www.thebackmassager.com/Chair_Features.html.
Chaumette et al., Serge; "Architecture and Evaluation of a User-centric NFC-enable Ticketing System for Small Events", Mobile Computing, Applications, and Services, vol. 95, 2012.
Cole, Shane; "MLB stadiums to deploy Apple's iBeacons for fan convenience, interactivity", appleinsider, Sep. 27, 2013.
COZZIA Instruction Manual EC-380, Oct. 14, 2015.
Emmerton et al., Craig; "Parkme Final Report", Parkme System, Dec. 12, 2008.
EventMobi—Simple Set-up, Custom Branding, Enhanced Sponsorship, Personal Agendas, Document Hosting, Audience Response, Multi-Event Conference App, Usage Analytics and More. Date of Download: Aug. 5, 2014, Http://www.eventmobi.com/product/features/.
"Fulham FC", Fulham Football Club, Aug. 6, 2014.
"Getting Started Guide", Flash Seats®Sysem, Oct. 14, 2015.
Grabkowski, Leonardo R.; "How to Activate Ford Heated Seats With a Remote Starter", eHOW, Date of Download: May 1, 2014 http://www.ehow.com/how_7685949_activate-heated-seats-remote-starter.html.
Hammond, Teena; "Stadiums race to digitize: How sports teams are scrambling to keep Millenials coming to games", TechRepublic. Apr. 12, 2014.
Ichinose, Noriyoshi; "Mobile E-Ticket and E-Membership Services", NEC Journal of Advanced Technology, vol. 1, No. 3. Jul. 6, 2004.
Kelly, Samantha M.; "Apple Feature to Turn MLB Stadiums Into Interactive Playgrounds", Mashable, Sep. 26, 2013.
Kleinmann, Zoe; "Luxury toilet users warned of hardware flaw", BBC News Technology, Aug. 5, 2013.
"Launch of ParkHub.com Brings Online Reservation System to the Parking Lot", Yahoo Finance, Dec. 29, 2010.
McDonald, Claire; Znap mobile payment platform. Inspect-a-Gadget. (Mar. 22, 2014).
Nash, Alastair; "Beacons—a digital revolution in the making?" Orange Digital perspectives, May 19, 2014.
"NCAA.com launches event apps for 2014 Men's and Women's Final Four", NCAA.com, Apr. 3, 2014.
"New Features on the Center's Web Site Give Patrons Their Very Own Box Office Right at Their Home Computer", Segerstrom Center for the Arts, New & Noteworthy. Date of Download: May 19, 2014.
Payeras-Capella et al., Magdalena; "A secure e-ticketing scheme for mobile devices with Near Field Communication (NFC) that includes exculpability and reusability", IEICE Trans. Fundamentals, vol. E93-A, No. 1 Jan. 2010.
Philadelphia Eagles Mobile App—May 8, 2014.
Rao, Leena; "ParkWhiz Is The OpenTable for Parking Spots", TechCrunch, Jul. 25, 2010.
"Revolutionising ticketing and event management globally", VEVA., Feb. 1, 2007.
"Singapore Grand Prix", Singapore GP PTE LTD, Jul. 31, 2014.
Suparta, Wyan; "Application of Near Field Communication Technology for Mobile Airline Ticketing", Journal of Computer Science 8 (8): 1235-1243, 2012, ISSN 1549-3636 © 2012 Science Publications.
Tennyson, Shawn; "iBeacon = Bluetooth Bliss", Sundog, Feb. 4, 2014.
Tong, Brian; "The technology behind NBA 2K13", CNET, Oct. 1, 2012.
Van Veghel, Katie A.; "Chicago Bulls Release Official Team App—Should Other NBA Teams Follow'?", SportTechie.com, Feb. 6, 2014.
Wang, Hongwei; "A Reservation-based Smart Parking System", Computer Science and Engineering, University of Nebraska—Lincoln, Jul. 1, 2011.
"Znap Stadium Solutions—Manage an entire ecosystem, all within a single app", znap, www.znap.com, Mar. 31, 2014.
PCT Application No. PCT/US2015/040205 International Search Report and Written Opinion mailed Dec. 3, 2015.
PCT Application No. PCT/US2015/047708 International Search Report and Written Opinion mailed Nov. 27, 2015.
U.S. Appl. No. 14/798,275, Final Office Action mailed Jun. 13, 2016.

(56) References Cited

OTHER PUBLICATIONS

U.S. Appl. No. 14/798,275, Office Action mailed Jan. 22, 2016.
U.S. Appl. No. 14/838,181, Office Action mailed May 20, 2016.
U.S. Appl. No. 14/838,181, Office Action mailed Oct. 15, 2015.
U.S. Appl. No. 14/839,151, Final Office Action mailed Apr. 12, 2016.
U.S. Appl. No. 14/839,151, Office Action mailed Oct. 23, 2015.

* cited by examiner

EVENT APPLICATION

CROSS-REFERENCE TO RELATED APPLICATIONS

This application is a continuation and claims the priority benefit of U.S. patent application Ser. No. 14/788,751 filed Jun. 30, 2015 and titled "Event Application," which claims the priority benefit of U.S. provisional application No. 62/023,520, filed on Jul. 11, 2014 and titled "One Time Event Fan App Controlled by the Team Owner," U.S. provisional application No. 62/045,030, filed on Sep. 3, 2014 and titled "One-Time Event Fan App Controlled by Team Owner and Third Parties," U.S. provisional application No. 62/045,032, filed on Sep. 3, 2014 and titled "One-Time Event Fan App Controlled by Team Owner Featuring Team-Specific Point of View," and U.S. provisional application No. 62/045,034, filed on Sep. 3, 2014 and titled "One-Time Event Fan App Controlled by Team Owner Featuring Player-Specific Point of View," the disclosures of which are incorporated herein by reference.

BACKGROUND OF THE INVENTION

Field of the Invention

The present invention relates generally to content management. More specifically, the present invention relates to selective information delivery based on user profiles.

Description of the Related Art

Event venues currently have a variety of options for communicating with event attendees. An event venue can include information when delivering the event ticket to an attendee. A venue can also include information on a website, post signs at the venue, or hand out information at the event.

It is difficult, however, to provide a comprehensive source of real-time information for a particular event. It is difficult for venue management to communicate with event attendees, target messages based on attendee preferences, and send real-time updates and alerts. This also makes it difficult for management to control attendee traffic or streamline other venue operations such as merchandise sales.

There is a need in the art for improved systems and methods for providing event information.

SUMMARY OF THE PRESENTLY CLAIMED INVENTION

One exemplary method for providing event information describes receiving a request from a user device for an app. The method also describes transmitting the app over a network to the user device. The app is associated with an event and unlocks when the user device is within a predetermined distance from a venue for the event. The method also describes transmitting information from an event database to the user device for display through the app when a user selects one of at least one information display options from the app. The transmitted information is associated with the event and the selected information display option.

One exemplary system for providing event information provides a processor and an event database. Execution of instructions stored in the memory by the processor performs a set of operations. The operations include receiving a request from a user device for an app. The operations also include transmitting the app over a network to the user device. The app is associated with an event and unlocks when the user device is within a predetermined distance from a venue for the event. The event database stores information for transmission from the event database to the user device for display through the app. The information is transmitted when a user selects one of at least one information display options from the app. The transmitted information is associated with the event and the selected information display option.

One exemplary non-transitory computer-readable storage medium is also described, the non-transitory computer-readable storage medium having embodied thereon a program executable by a processor to perform an exemplary method for providing event information. The exemplary program method describes receiving a request from a user for an app. The program method also describes transmitting the app over a network. The app is associated with an event. The program method also describes transmitting information from an event database for display through the app when a user selects one of at least one information display options from the app. The transmitted information is associated with the event and the selected information display option.

DETAILED DESCRIPTION

The present invention includes systems and methods for providing event information. A user device user is presented with a choice to purchase a one-time use event information application ("app") during the purchase of an event ticket. The user can purchase a plurality of information options for the one-time use app. The one-time use app is downloaded to the user device when the user elects to purchase the app. The app is associated with the event and event ticket and receives event-related information from an event database. The event database receives information from a plurality of sources. The sources are each associated with an application programming interface. The app provides event-related information to the user through the purchased options. The app can filter information based on a user profile before providing the information to the user.

Event information can be provided for entertainment or cultural events that are presented at a theatre, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, the opera, and the like; religious events; and more permanent exhibitions such as museum, historic home, and the like.

Figure 1:
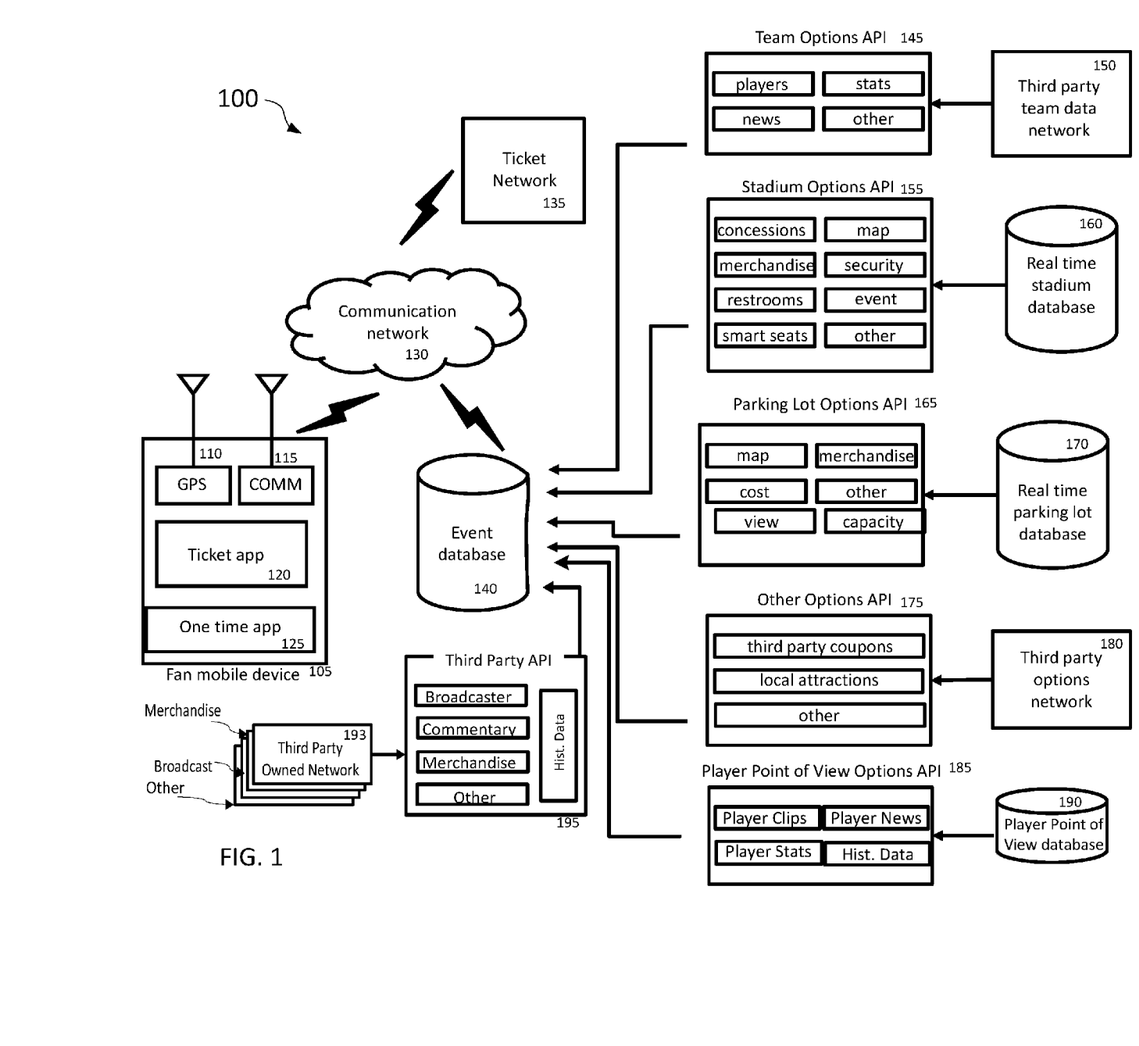
FIG. 1 illustrates a system for providing event information.

FIG. 1 illustrates a system 100 for providing event information. The system 100 of FIG. 1 includes a fan mobile device 105, a communication network 130, a ticket network 135, an event database 140, and one or more team networks 143. The team network 143 includes a team options application programming interface (API) 145, a third party team data network 150, a stadium options API 155, a real time stadium database 160, a parking lot options API 165, a real time parking lot database 170, an other options API 175, and a third party options network 180. The team network 143 can also include a player point of view options API 185 and a player point of view database 190. The team network 143 can also include one or more third party networks 193 and a third party owned API 195. The team network 143 can be configured to emphasize information for a particular team.

The fan mobile device 105 includes a global positioning system (GPS) sensor 110, a communications means 115, a ticket application ("app") 120, and a one time app 125. The fan mobile device 105 communicates via the communication network 130 using the communications means 115. The fan mobile device 105 can be a smartphone owned by an event attendee. A fan mobile device user can make ticket purchases from the ticket network 135 using the ticket app 120. The ticket network can be an online ticket vendor. A fan mobile device user can also acquire the one time app 125 using the ticket app 120.

The third party team data network 150 connects to the team options API 145, the real time stadium database 160 connects to the stadium options API 155, the real time parking lot database 170 connects to the parking lot options API 165, the third party options network 180 connects to the other options API 175, the player point of view database 190 connects to the player point of view options API 185, and the one or more third party owned networks 193 connects to the third party owned API 195. The team options API 145, the stadium options API 155, the parking lot options API 165, the other options API 175, the player point of view options API 185, and the third party owned API connect to the event database 140. The third party team data network 150 provides team information. The real time stadium database 160 provides real time stadium information. The real time parking lot database 170 provides real time parking lot information. The third party options network 180 provides third party information such as information on local attractions or coupons. The player point of view database provides player information. The one or more third party owned networks 193 provide information such as broadcasts and merchandise. The third party team data network 150, the real time stadium database 160, the real time parking lot database 170, the third party options network 180, the player point of view database 190, and the one or more third party owned networks 193 send information to the event database 140 through the corresponding API. The one time app 125 can access the event database 140 via the communication network 130. A fan mobile device user can view event information from the event database 140 using the one time app 125.

Figure 2A:
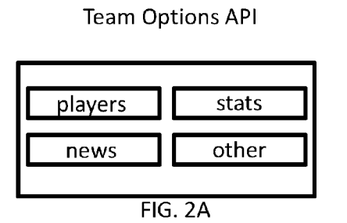
FIG. 2A illustrates a team options API.
Figure 2B:
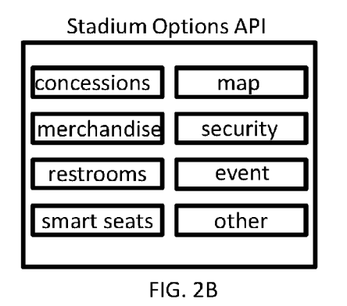
FIG. 2B illustrates a stadium options API.
Figure 2C:
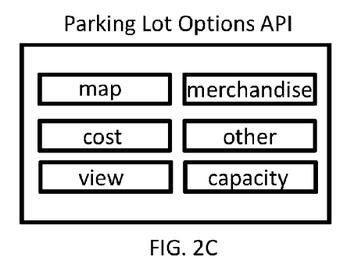
FIG. 2C illustrates a parking lot options API.
Figure 2D:
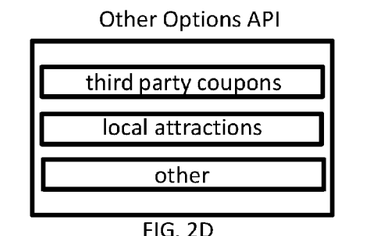
FIG. 2D illustrates another options API.
Figure 2E:
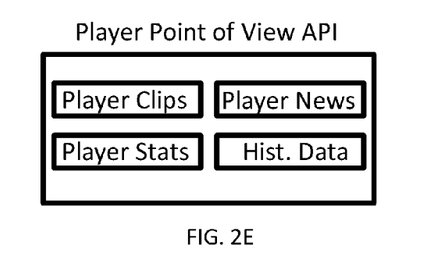
FIG. 2E illustrates a player point of view options API.
Figure 2F:
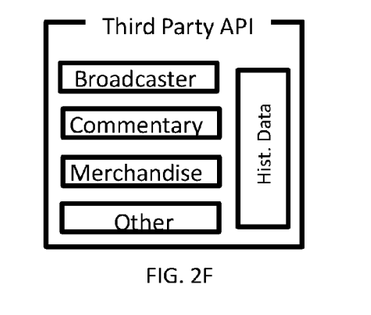
FIG. 2F illustrates a third party API.

FIG. 2A illustrates the team options API 145. The team options API 145 includes methods for displaying on the one time app 125 players data, news data, statistics data, and other data from the third party team data network 150. FIG. 2B illustrates the stadium options API 155. The stadium options API 155 includes methods for displaying on the one time app 125 concessions data, merchandise data, restrooms data, smart seats data, map data, security data, event data, and other data from the real time stadium database 160. FIG. 2C illustrates the parking lot options API 165. The parking lot options API 165 includes methods for displaying on the one time app 125 map data, cost data, camera data for the parking lot, merchandise data, other data, and capacity data from the real time parking lot database 170. FIG. 2D illustrates the other options API 175. The other options API 175 includes methods for displaying on the one time app 125 third party coupon data, local attractions data, and other data from the third party options network 180. FIG. 2E illustrates the player point of view options API 185. The player point of view options API 185 includes methods for displaying on the one time app 125 player clip data, player statistics data, player news data, and historical data from the player point of view database 190. FIG. 2F illustrates the third party API 195. The third party API 195 includes methods for displaying on the one time app 125 broadcast data, commentary data, merchandise data, other data, and historical data from the one or more third party owned networks 193.

Figure 3:
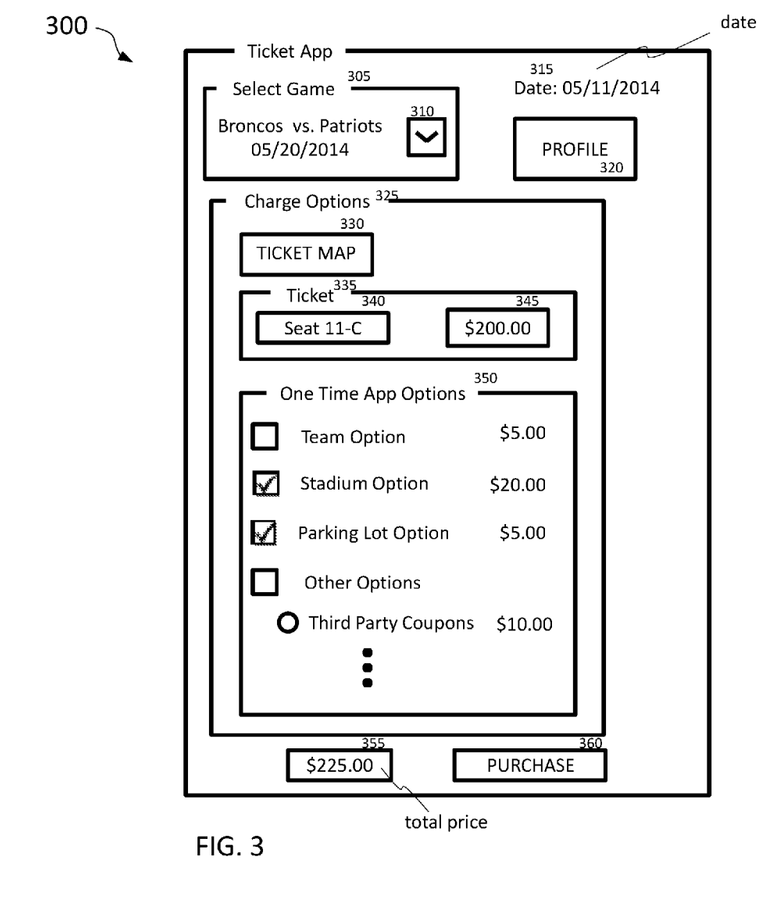
FIG. 3 illustrates a ticket app graphical user interface for a ticket app.

FIG. 3 illustrates a ticket app graphical user interface (GUI) 300 for the ticket app 120. The ticket app GUI 300 of FIG. 3 includes a select game section 305, a display of the current date 315, a profile button 320, a charge options section 325, a total price display 355, and a purchase button 360. The charge options section 325 includes a ticket map button 330, a ticket section 335, and a one time app options section 350.

The select game section 305 can include a pull-down menu 310 through which a ticket app user can select a game. The select game section 305 includes a display of the selected game, where the date of the game and the teams playing in the game can be included. A ticket app user can access a user profile GUI (not shown) using the profile button 320.

A ticket app user can access a ticket map for the selected game using the ticket map button 330. The ticket map can be a seating map of the venue and include the price of different seats. The ticket section 335 can display a seat number 340 and a price 345 for a seat when a ticket app user selects the corresponding seat from the ticket map.

The one time app options section 350 can include a team option, a stadium option, a parking lot option, and an other option, where each option can be associated with a corresponding network (e.g., the third party team data network 150 or the third party options network 180) or database (e.g., the real time stadium database 160, the real time parking lot database 170, or the player point of view database 190). The one time app 125 provides information from the networks and databases when the corresponding one time app option is selected. The one time app options section 350 can also include a display of a corresponding price for each option. A ticket app user can add one or more options to a one time app by selecting the corresponding option in the one time app options section 350. The one time app options section 350 can include a checkbox or a radio button next to an option for selection.

The total price display 355 displays the total price of the ticket selected in the ticket section 335 and the options selected in the one time app options section 350. The ticket app 300 will present a payment screen (not shown) to a user when the user selects the purchase button 360. A user can pay for the selected ticket and the selected options using the payment screen. The one time app 125 with the selected options will download to the fan mobile device 105 after payment. The downloaded one time app is associated with the purchased ticket. The ticket network can provide a one time app download link to the user after payment.

Figure 4:
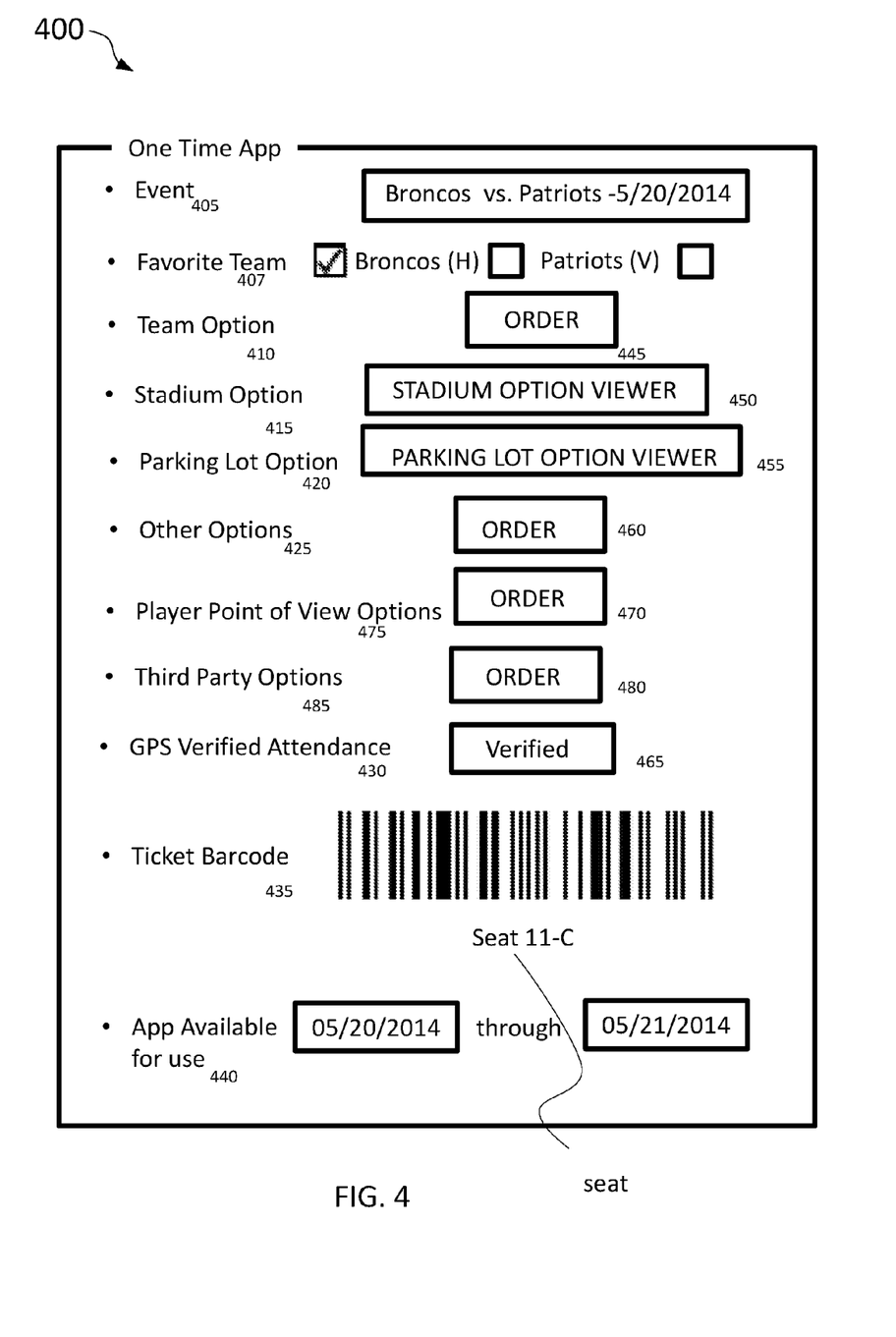
FIG. 4 illustrates a one-time app graphical user interface for a one-time app.

FIG. 4 illustrates a one time app GUI 400 for the one time app 125. The one time app GUI 400 of FIG. 4 includes an event display 405, a team option display 410, a stadium option display 415, a parking lot option display 420, an other options display 425, a GPS verified attendance display 430, a ticket barcode display 435, and an app availability display 440. The one time app GUI 400 can also include a player point of view options display 475 and a third party options display 485. The one time app GUI 400 can also include a favorite team selection 407. The event display 405 displays an event label for the associated event ticket, where the date of the game and the teams playing in the game can be included. A user can select a favorite team or select "neither" using the favorite team selection 407. The one time app options can provide information to a user based on a user's selection in the favorite team selection 407. The team option display 410, the stadium option display 415, the parking lot option display 420, the other option display 425, the player point of view options display 475, and the third party options display 485 can include an "order" button 445, 460, 470, 480 or a "viewer" button 450, 455. A one time app GUI user can use a "viewer" button 450, 455 to access the corresponding option. A user can access the stadium option using the stadium option viewer 450. A user can access the parking lot option using the parking lot option viewer 455. A user can purchase an option using a corresponding "order" button 445, 460, 470, 480.

The GPS verified attendance display 430 includes a status display 465. The status display 465 indicates whether the one time app 400 is verified. The one time app 400 can be configured such that the one time app 400 or particular one time app options are locked until verification is complete. The one time app 400 or particular one time app options can unlock when the GPS sensor 110 confirms the fan mobile device is at the event venue.

The ticket barcode display 435 displays a barcode for a purchased ticket, where the ticket is associated with the event displayed in the event display 405. The ticket barcode display can also specify the seat associated with the displayed barcode. The app availability display 440 provides information regarding the availability of the one time app 400. The app availability display 440 can provide a beginning date and an end date for when the one time app 125 is available for use. The first day the one time app 400 is available can be the day of the event begins and the last day the one time app 400 is available can be the day the event ends. The one time app 400 can be configured to automatically delete or relock after the event ends.

Figure 5:
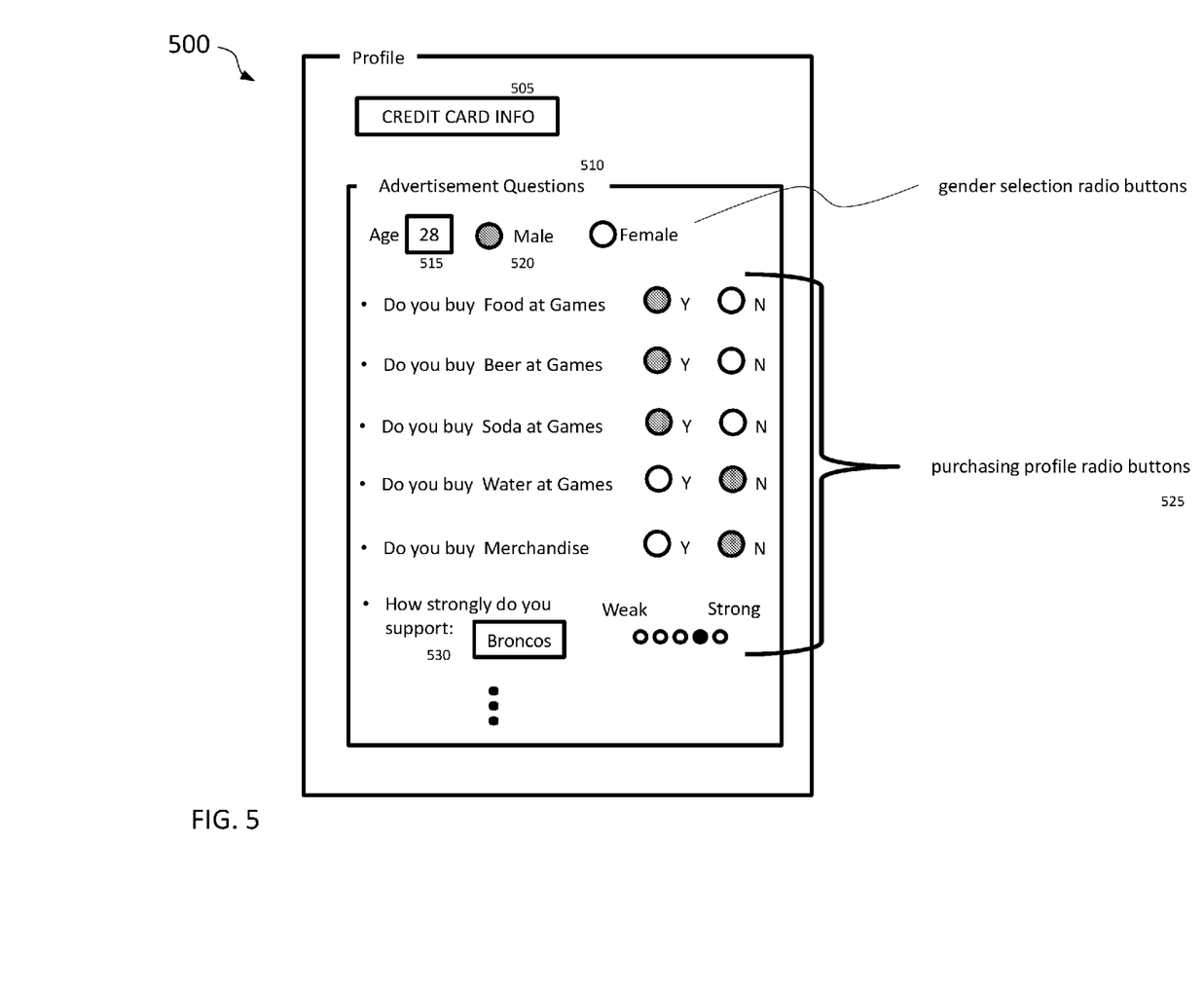
FIG. 5 illustrates a profile graphical user interface.

FIG. 5 illustrates a profile GUI. The profile GUI of FIG. 5 includes a credit card information button 505 and an advertisement question section 510. The advertisement question section 510 includes an age input 515, a gender input 520, and one or more purchase profile inputs 525. The advertisement question section 510 can also include one or more team interest profile inputs 530. A profile GUI user can access a credit card information input screen (not shown) by pressing the credit card information button 505. A user can provide age information and gender information using the age input 515 and the gender input 520, respectively. A user can also provide purchase information using the one or more purchase profile inputs 525. A user can also provide information regarding the user's support for a team. A user can also provide personal information such as name, address, and email information for input into the profile. The one time app options can provide information based on user-provided information in the profile.

Figure 6:
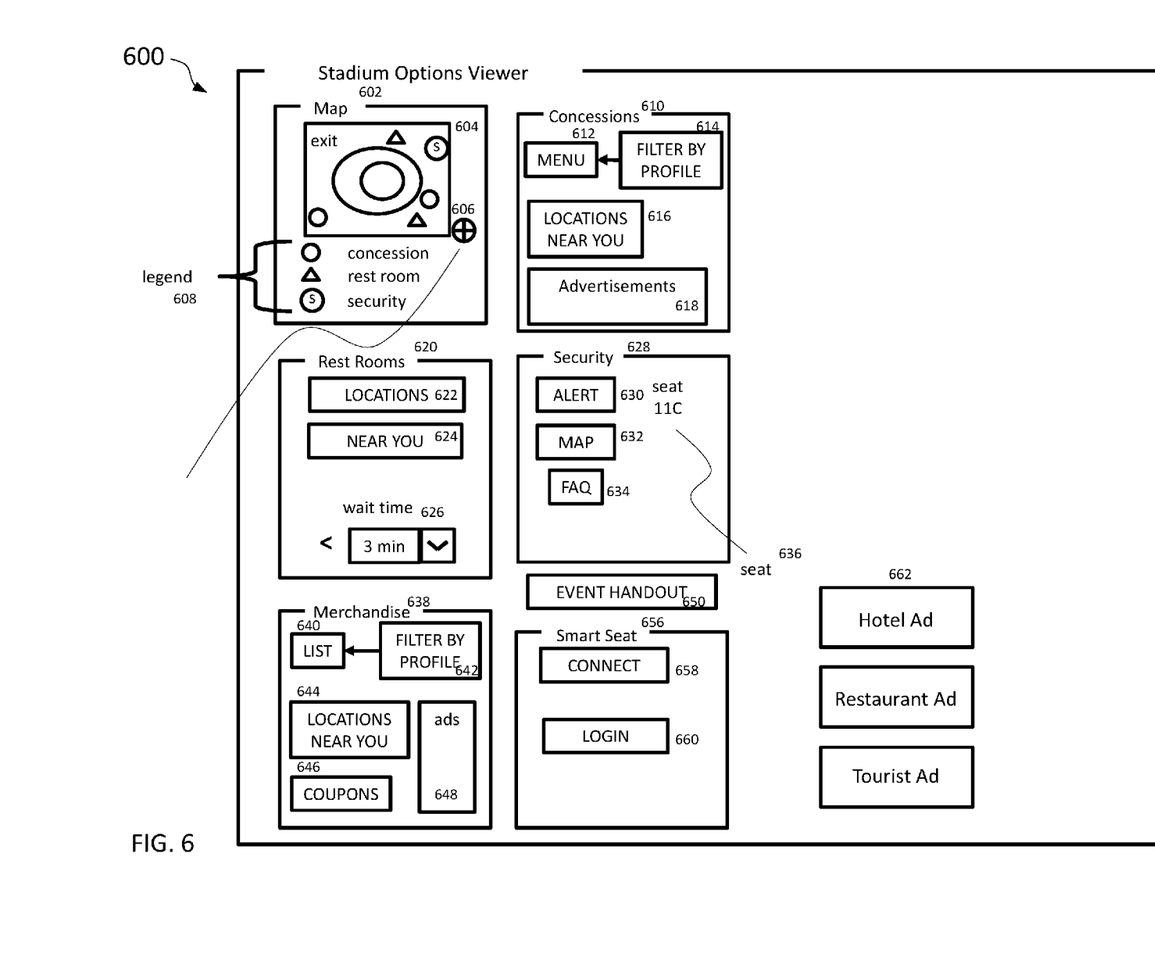
FIG. 6 illustrates a stadium options viewer.

FIG. 6 illustrates a stadium options viewer 600. The stadium options viewer 600 of FIG. 6 includes a map section 602, a concessions section 610, a rest rooms section 620, a security section 628, a merchandise section 638, an event handout button 650, and a smart seat section 656. The stadium options viewer 600 can also include a general ad section 662. The map section 602 includes a venue map 604, an expand button 606 for the map, and a map legend 608. The map can include location information for one or more concessions, one or more restrooms, and one or more security personnel. A stadium options viewer user can use the map legend 608 to read the map. A user can also use the expand button 606 to enlarge the map 602 in the display.

The concessions section 610 includes a menu button 612, a filter by profile button 614, a "locations near you" button 616, and an advertisements display 618. A user can view a menu using the menu button 612. A user can view a menu filtered by the user profile by using the filter by profile button 614. A user can view nearby concessions using the "locations near you" button 616. The stadium options viewer can display advertisements in the advertisements display 618.

The rest rooms section 620 includes a locations button 622, a "near you" button 624, and a wait time section 626. A user can view restroom locations using the locations button 622. A user can view nearby restrooms using the "near you" button 624. A user can filter restrooms based on wait time using the wait time section 626. A user can select a maximum wait time using a pull-down menu in the wait time section 626. When a user selects a maximum wait time, the locations button 622 and the "near you" button 624 will display restrooms with wait times of or below the maximum wait time selected by the user.

The security section 628 includes an alert button 630, a map button 632, a frequently asked questions button 634, and a seat display 636. A user can alert security personnel regarding a security issue using the alert button 630. A user can view a map with security personnel location information using the map button 632. A user can view frequently asked questions regarding security of the event by using the frequently asked questions button 634. The seat display 636 displays the seat number corresponding to the purchased ticket associated with the one time app 125.

The merchandise section 638 includes a list button 640, a filter by profile button 642, a "locations near you" button 644, a coupons button 646, and an ads display 648. A user can view a merchandise list using the list button 640. A user can view a merchandise list filtered by the user profile by using the filter by profile button 642. A user can view nearby merchandise sellers using the "locations near you" button 644. A user can view merchandise coupons using the coupon button 646. The stadium options viewer can display advertisements in the advertisements display 648. The merchandise section 638 can also include a suggested merchandise list (not shown). The suggested merchandise list includes merchandise selected based on user information. The suggested merchandise list can include, for example, items targeted for children when a user has a child. The suggested merchandise list can include, for example, small-portable items when a user is a visitor. The suggested merchandise list can include items such as local event tickets or fragile items for a local user, where a local user can more easily transport fragile items and attend a local event at a different time. The suggested merchandise list also includes items based on user interest such as favorite teams.

The smart seat section 656 includes a connect button 658 and a login button 660. A user can connect to a network at the venue using the connect button 658. A user can input network log-in information using the login button 660 when log-in information is required to connect to the network. A venue can provide a network connection at each seat, where each seat has a hardwire connection to a network.

A user can view an event handout using the event handout button 650. An event handout can include event information such as a play card from the event. The general ad section 662 displays ads based on user information. The general ad section 662 can display, for example, hotel, restaurant, or tourist ads when a user is a visiting user.

Figure 7:
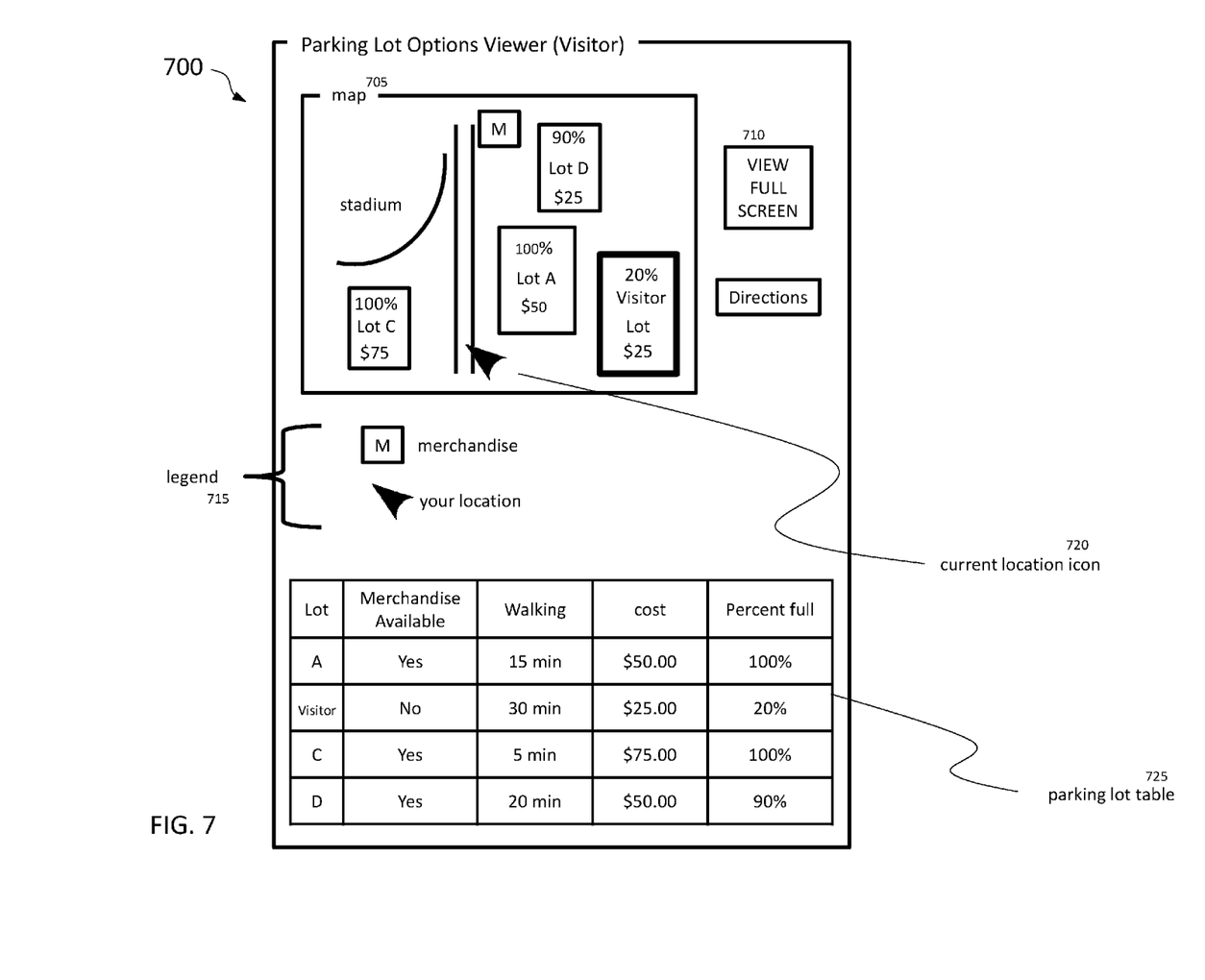
FIG. 7 illustrates a parking lot options viewer.

FIG. 7 illustrates a parking lot options viewer 700. The parking lot options viewer 700 of FIG. 7 includes a map 705, a view full screen button 710, a legend 715 for the map, and an information table 725. The map includes parking lot locations relative to the venue, as well as parking lot information. Parking lot information can include parking fee and occupancy information. The map can include a current location icon 720 and location information for one or more merchandise sellers. A user can expand the map using the view full screen button 710. The information table 725 includes information for each parking lot. Parking lot information can include the availability of merchandise for purchase, travel time from the parking lot to the stadium, parking fee, and occupancy. A "Lot A," for example, can have merchandise for purchase, be a 15-minute walk to the stadium, require a parking fee of $50.00, and have no available parking. The parking lot options viewer 700 can emphasize a visitor lot in the map when the user is a visitor.

Figure 8:
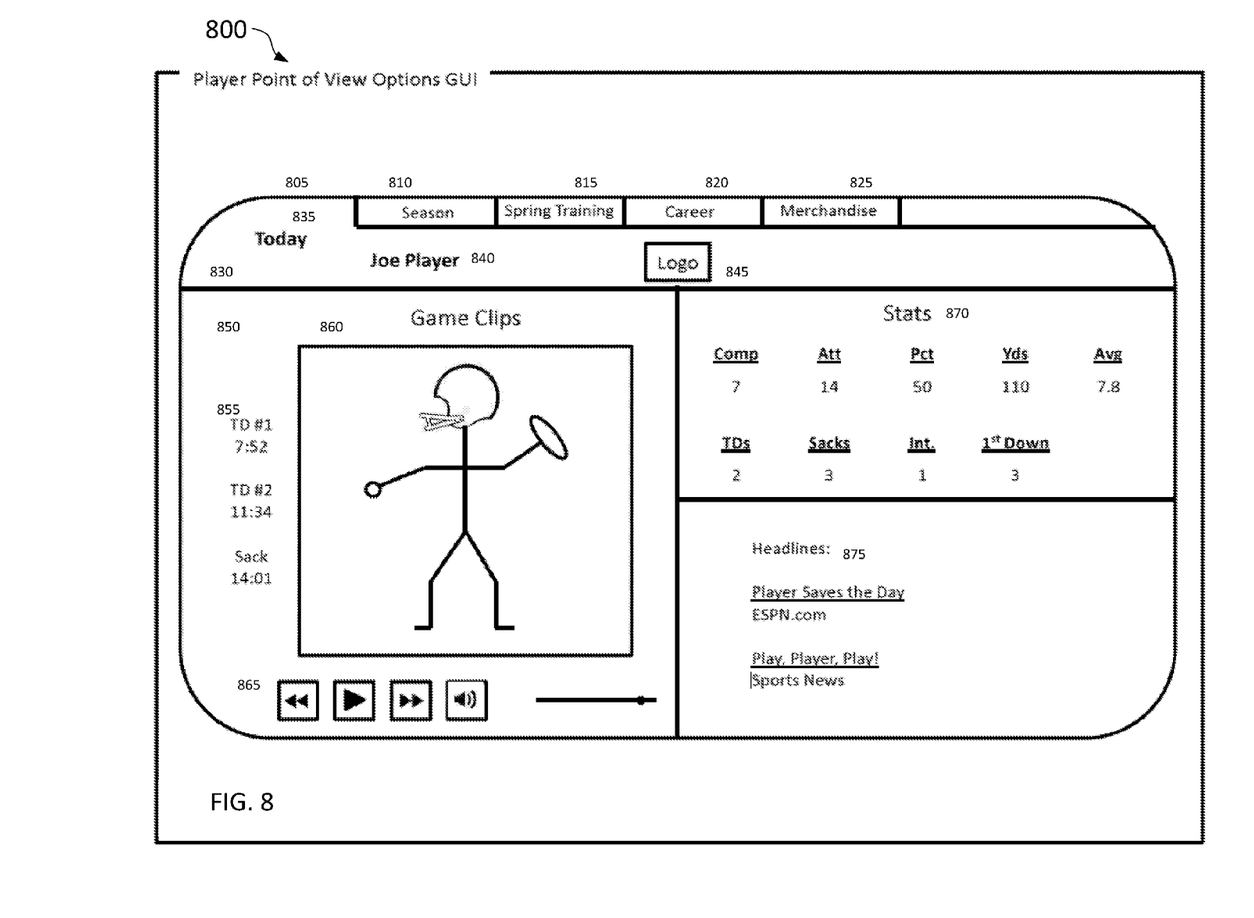
FIG. 8 illustrates a player point of view options graphical user interface.

FIG. 8 illustrates a player point of view options GUI 800. The player point of view options GUI 800 of FIG. 8 includes a today tab 805, a season tab 810, a spring training tab 815, a career tab 820, and a merchandise tab 825. The today tab 805, the season tab 810, the spring training tab 815, and the career tab 820 include an identification display 830, a game clip section 850, a statistics section 870, and a headlines section 875. A user can purchase merchandise associated with the selected player in the merchandise tab 825.

The identification display 830 includes a tab label 835 identifying the selected tab, a player label 840 identifying a player, and a logo 845 associated with the player's team. The game clip section 850 includes a clip list 855, a clip viewer 860, a plurality of viewer control options 865. A one time app user can select a clip from the clip list 855 to view the clip in the clip viewer 860. The clip list 855 can display the clips as an event label (e.g., TD #1) with a timestamp associated with the game. The user can also control the clip viewer 860 using the plurality of viewer control options 865. The plurality of viewer control options 865 can include rewind, play, fast forward, and volume.

The statistics section 870 includes statistics for the selected player. Statistics can include completions, attempts, percentage, yards, average, touchdowns, sacks, interceptions, and first downs. The headlines section 875 includes news headlines associated with the selected player. A user can click a headline to see the associated article.

A user who purchases the player point of view options can access the player point of view options GUI 800 from the player point of view options display 475. A one time app user can view a tab for a particular player by selecting the tab.

Figure 9:
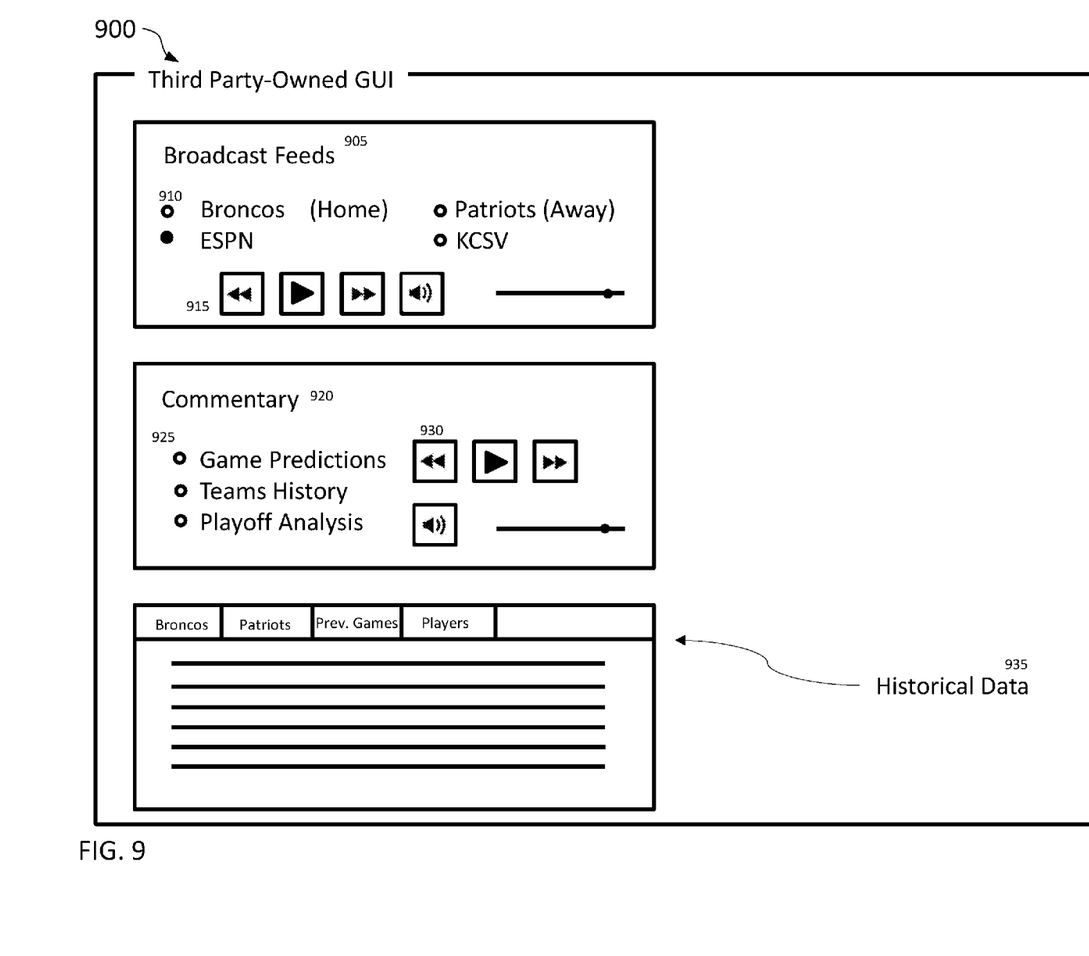
FIG. 9 illustrates a third party-owned graphical user interface.

FIG. 9 illustrates a third party-owned GUI 900. The third party-owned GUI 900 of FIG. 9 includes a broadcast feed section 905, a commentary section 920, and a historical data section 935. The broadcast feed section 905 includes a feed list 910 and a plurality of feed controls 915. A one time app user can listen to a feed through the fan mobile device 105 by selecting a feed from the feed list 910. The user can control the selected feed using the plurality of feed controls 915. The plurality of feed controls can include rewind, play, fast forward, and volume.

The commentary section 920 includes a commentary list 925 and a plurality of commentary controls 930. The commentary list 925 can include game predictions, teams history, and playoff analysis. A one time app user can listen to a commentary through the fan mobile device 105 by selecting a commentary from the commentary list 925. The user can control the selected commentary using the plurality of commentary controls 930. The plurality of commentary controls can include rewind, play, fast forward, and volume.

The historical data section 935 includes a tab for each team in the game, a previous games tab, and a players tab. A one time app user can select a tab for a team to view historical data associated with the team of the selected tab. A one time app user can select the previous games tab to view historical data associated with the previous games. A one time app user can select the players tab to view historical data associated with players. A user who purchases the third party options can access the third party-owned GUI 900 from the third party options display 485.

Figure 10:
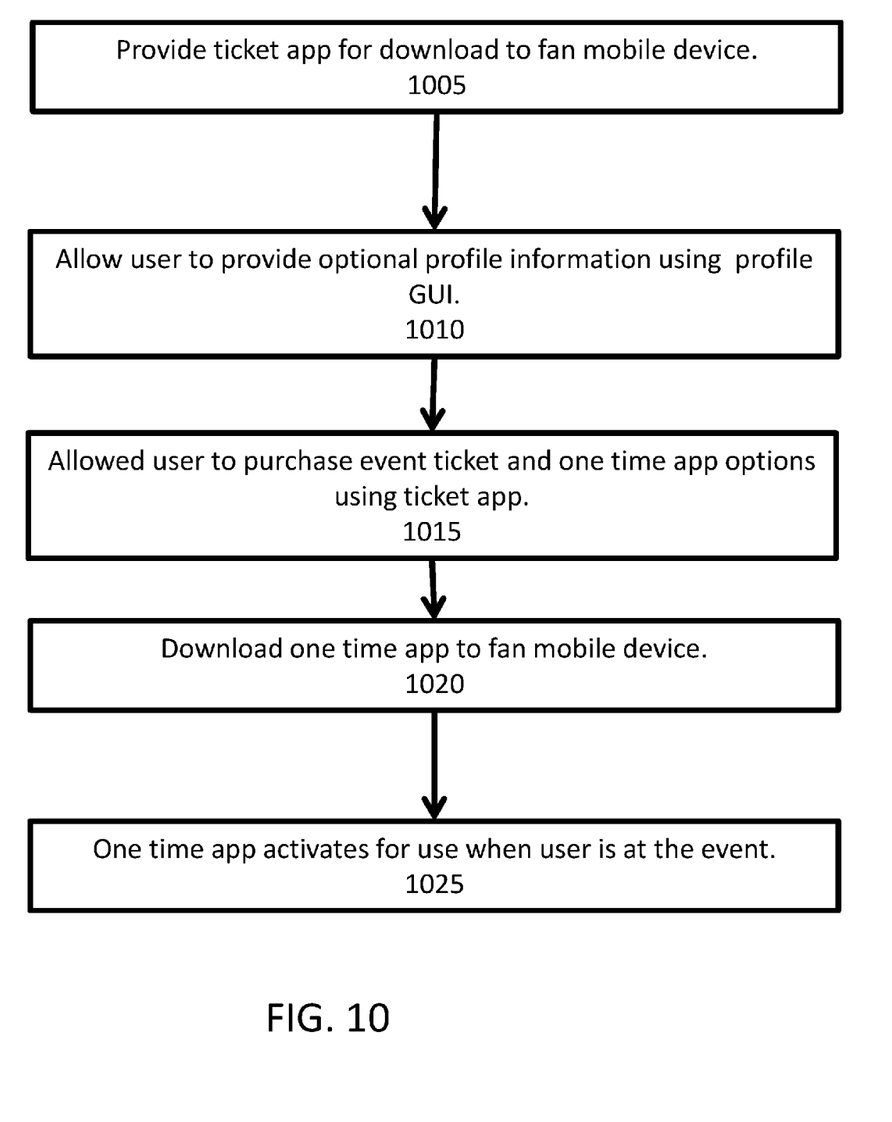
FIG. 10 illustrates a workflow for providing event information.

FIG. 10 illustrates a workflow 1000 for providing event information. In step 1005 of FIG. 10, a user is provided with the ticket app 120 for download to the fan mobile device 105. In step 1010, a user is allowed to provide optional profile information using the profile GUI 500. A user can access the profile GUI 500 using the ticket app 120.

In step 1015, a user is allowed to purchase an event ticket and one or more one time app options using the ticket app 120. In step 1020, the one time app 125 is downloaded to the fan mobile device 105. A user can be provided with a link to download the one time app 125. The one time app 125 includes options selected by a user. A user can select additional options through the ticket app 120 or the one time app 125.

In step 1025, the one time app activates for use when a user is at the corresponding event. The one time app unlocks based on GPS location information, as provided through the GPS sensor 110. The one time app 125 can automatically relock or be deleted after a preset period subsequent to an event. The one time app 125 can access the event database 140 to provide information to a user through selected one time app options. The one time app 125 can filter information based on profile information.

While various embodiments have been described above, it should be understood that they have been presented by way of example only, and not limitation. The present descriptions are not intended to limit the scope of the presently claimed invention or to limit the scope of embodiments of the presently claimed invention. The present descriptions are intended to cover alternatives, modifications, and equivalents consistent with the spirit and scope of the disclosure.

What is claimed is:

1. A method for providing event information, the method comprising:
    receiving a request from a user device for an application specific to an event, the request received over a communication network at an event venue server;
    transmitting, from the event venue server, the application over a network for download by the user device based on the received request, wherein access to the application is limited to a predefined time period associated with the event;
receiving a user selection of at least one information display option via the application, wherein the user selection of an information display option corresponds to a request for information from the event venue server;
determining that the user selection was received within the predefined time period associated with the event; and
transmitting information from an event database associated with the event venue server to the user device for display within the application based on the user selection and the determination that the user selection was received within the predefined time period associated with the event, wherein another request determined to have been received outside the predefined time period is denied.

2. The method of claim 1, wherein the received request is provided through scanning a barcode on an event ticket associated with the event.

3. The method of claim 1, wherein access to the application is only allowed on the day of the event.

4. The method of claim 1, wherein the information associated with the selected information is filtered before display using a user profile.

5. The method of claim 1, wherein the event database receives information from a plurality of sources, each of the plurality of sources delivering information through an associated application programming interface to the event database.

6. The method of claim 5, wherein the event database receives information from at least one source owned by a third party.

7. The method of claim 1, wherein the application is automatically deleted after the event.

8. A system for providing event information, the system comprising:
a network interface that communications over a communication network to:
receive a request from a user device for an application specific to an event,
transmit the application over a network for download by the user device based on the received request, wherein access to the application is limited to a predefined time period associated with the event,
receive a user selection of at least one information display option via the application, wherein the user selection of an information display option corresponds to a request for information from the event database,
a processor that executes instructions stored in memory, wherein execution of the instructions by the processor determines that the user selection was received within the predefined time period associated with the event; and
an event database that stores information for transmission from an event database to the user device for display within the application based on the user selection and the determination that the user selection was received within the predefined time period associated with the event, wherein another request determined to have been received outside the predefined time period is denied.

9. The system of claim 8, wherein the received request is provided through scanning a barcode on an event ticket associated with the event.

10. The system of claim 8, wherein access to the application is only allowed on the day of the event.

11. The system of claim 8, wherein the information associated with the selected information is filtered before display using a user profile.

12. The system of claim 8, wherein the event database receives information from a plurality of sources, each of the plurality of sources delivering information through an associated application programming interface to the event database.

13. The system of claim 12, wherein the event database receives information from at least one source owned by a third party.

14. The system of claim 8, wherein the application is automatically deleted after the event.

15. A non-transitory computer-readable storage medium having embodied thereon a program executable by a processor to perform a method for providing event information, the method comprising:
receiving a request from a user device for an application specific to an event, the request received over a communication network at an event venue server;
transmitting the application over a network for download by the user device based on the received request, wherein access to the application is limited to a predefined time period associated with the event;
receiving a user selection of at least one information display option via the application, wherein selection of an information display option corresponds to a request for information from the event venue server;
determining that the user selection was received within the predefined time period associated with the event; and
transmitting information from an event database associated with the event venue server to the user device for display within the application based on the user selection and the determination that the user selection was received within the predefined time period associated with the event, wherein another request determined to have been received outside the predefined time period is denied.

16. The non-transitory computer readable storage medium of claim 15, wherein the received request is provided through scanning a barcode on an event ticket associated with the event.

17. The non-transitory computer readable storage medium of claim 15, wherein access to the application is only allowed on the day of the event.

18. The non-transitory computer readable storage medium of claim 15, wherein the information associated with the selected information is filtered before display using a user profile.

19. The non-transitory computer readable storage medium of claim 15, wherein the event database receives information from a plurality of sources, each of the plurality of sources delivering information through an associated application programming interface to the event database.

20. The non-transitory computer readable storage medium of claim 19, wherein the event database receives information from at least one source owned by a third party.

* * * * *